United States Patent
Lee et al.

(10) Patent No.: US 6,411,645 B1
(45) Date of Patent: Jun. 25, 2002

(54) MODULATION APPARATUS OF MULTICARRIER DIRECT SEQUENCE SPREAD SPECTRUM COMMUNICATION SYSTEM

(75) Inventors: Dong Wook Lee, Dejon-Shi; Hun Lee, Deajon-Shi, both of (KR)

(73) Assignee: Electronics and Telecommunications Research Institute, Daejon-Shi (KR)

(*) Notice: Subject to any disclaimer, the term of this patent is extended or adjusted under 35 U.S.C. 154(b) by 0 days.

(21) Appl. No.: 09/137,076

(22) Filed: Aug. 20, 1998

(30) Foreign Application Priority Data

Aug. 21, 1997 (KR) .............................. 97-39861

(51) Int. Cl.[7] .......................... H04L 27/30; A61F 2/06; H04B 7/015; H04B 15/00
(52) U.S. Cl. ...................... 375/140; 375/130; 375/141; 375/146; 455/522
(58) Field of Search ................ 375/206, 130, 375/135, 260, 263, 140, 141, 146; 455/522

(56) References Cited

U.S. PATENT DOCUMENTS

| | | | | |
|---|---|---|---|---|
| 5,323,391 A | * | 6/1994 | Harrison | 370/70 |
| 5,729,570 A | * | 3/1998 | Magill | 375/205 |
| 5,751,705 A | * | 5/1998 | Sato | 370/338 |
| 5,960,032 A | * | 9/1999 | Letaief et al. | 375/206 |
| 6,108,364 A | * | 8/2000 | Weaver, Jr. et al. | 375/130 |

OTHER PUBLICATIONS

Antoine chouly, americo Brajal and Sabine Jourdan; Orthogonal multicarrier techniques applied to direct sequence spread spectrum CDMA systems, IEEE 1993, pp. 1723–1728.*

Douglas N. Rowitch and Laurence B. milstein; Convolutional Cding for Direct Sequence Multicarrier CDMA, IEEE 1995, pp. 55–59.*

R. O'neil, L.B. Lopes; Envelope Variations and spectral Splatter in Clipped Multicarrier Signals, IEEE 1995, pp. 71–75.* hongnian Xing & Petri Jarske, Frequency Domain Equalization for Multi–Carrier Spread Spectrum System in Multipath Fading Channel, IEEE 1996, pp. 603–606.*

Volker Aue et al., "Multi–Carrier Spread Spectrum Modulation with Reduced Dynamic–Range", 1996, pp. 914–917.

T A Wilkinson et al., "Minimisation of the Peak to Mean Envelope Power Ratio of Multicarrier Transmission Schemes by Block Coding", 1995, pp. 825–829.

* cited by examiner

Primary Examiner—Chi Pham
Assistant Examiner—Tony Al-Beshrawi
(74) Attorney, Agent, or Firm—Cohen, Pontani, Lieberman & Pavane

(57) ABSTRACT

The present invention relates to a signal modulation apparatus of multicarrier direct sequence spread spectrum communication system. There was a problem that since multiple carrier having different frequencies are modulated by a baseband signal and the results are added to be transmitted, the enveloped variation of transmitted signal is very large. A modulation apparatus of multicarrier direct sequence spread spectrum system is suggested to solve such problems, which can reduce the enveloped variation of transmitted signal by inverting the polarity of baseband signal which modulates one of four carriers in the case when the same baseband signal is used to modulate the multiple carriers and by inverting the plurality of one of two Walsh code pairs having two adjacent indexes by using the characteristics of Walsh function in case when different baseband signals should be used to modulate four carriers.

9 Claims, 2 Drawing Sheets

MODULATION APPARATUS OF MULTICARRIER DIRECT SEQUENCE SPREAD SPECTRUM COMMUNICATION SYSTEM

BACKGROUND OF THE INVENTION

1. Field of the Invention

The present invention relates to a signal modulation of direct sequence spread spectrum communication system and, particularly to a modulation apparatus of multicarrier direct sequence spread spectrum communication system.

2. Information Disclosure Statement

Code division multiple access (CDMA) method using Direct Sequence Spectrum Spread Communication method is currently used in digital cellular and personal mobile communication system. Next generation CDMA system of high data transmission rate must use wider frequency band. To use a wider frequency in CDMA signal transmission method, a single carrier and a multicarrier direct sequence spread spectrum communication methods can be used.

In the single carrier direct sequence spread spectrum communication method, one carrier is modulated by a spectrum spread signal obtained by combining a data with a PN sequence having a faster code chip generation rate than that used in narrow band direct sequence spread spectrum communication system. In the multicarrier direct sequence spread spectrum communication method, multiple disjoint carriers are modulated by a spectrum spread signal obtained by combining data and a sequence having the same code chip generation rate as that used in the narrow band direct sequence spread spectrum system. In the multicarrier system, since the channel characteristics is different for each frequency, a diversity gain can be obtained at the time of signal reception. Since there is no need of using a fast operating device in baseband multicarrier signal processing, electric power consumption can be reduced, and, further, since there is no need of using successive frequency bands in contrast to the case of using single frequency, the efficiency of frequency resource can be raised. However, the method using multiple carriers has a problem in that since multiple carriers having different frequencies are modulated and added, the variance of the envelope of transmitted signal is significantly large in comparison with the method using single carrier. Thus, to prevent the signal from being distorted, the electric power amplifier at the end of transmit system using multiple carriers must have significantly excellent linear characteristics in comparison with a single carrier system.

There are two methods suggested to reduce the variance of envelope of transmitted signal of multicarrier system. First method is to adjust the magnitude of baseband signal of each carrier by repeating Fourier Transform and Inverse Fourier Transform, and second method is to use a block coding.

In the first method, the magnitude of base band signal modulating each carrier is adjusted depending on the code selection of code and, as a result, the magnitude of signal for each channel is different. This makes frequency diversity gain reduced. This method has a disadvantage in the system complexity to apply the method to direct sequence spread spectrum communication. In the second method, a block coding technique should be used in code chip. Although this method can be applied to multicarrier direct sequence spread spectrum communication system, the new code generated as a result of block coding the PN code cannot be guaranteed to have the same property as a PN code for distinguishing from other user's code, and the code generation apparatus becomes complicated.

SUMMARY OF THE INVENTION

Therefore, the object of the present invention is to provide a modulation apparatus of a multicarrier direct sequence spread spectrum communication system, which can reduce the envelope variation of transmitted signal by making a baseband signal have a sign opposite to the remaining three baseband signals among four baseband binary signals which modulate four different carriers.

A modulation apparatus of multicarrier direct sequence spread spectrum communication system according to a first embodiment of the present invention to achieve the above described object is characterized in that it comprises a pseudo noise code generation apparatus for generating a binary pseudo noise code; a spread spectrum combiner for generating a spread spectrum signal by EXOR operation of the binary pseudo noise code and user digital data; a waveform shaping apparatus for generating a shaped spread spectrum signal by shaping the waveform of the spread spectrum signal; a digital/analog converter for converting the waveform-shaped signal to analog value; a plurality of carrier modulation apparatuses for modulating a plurality of carriers each having different frequency by taking the analog values as inputs; and an inverter for converting the polarity of one input signal among the plurality of carrier modulation apparatuses.

Further, a modulation apparatus of multicarrier direct sequence spread spectrum communication system according to a second embodiment of the present invention is characterized in that it comprises a pseudo noise code generation apparatus for generating a binary pseudo noise code; a spread spectrum combiner for generating a spread spectrum signal by EXOR operation of the binary pseudo noise code and user digital data; a plurality of Walsh code generation apparatuses for generating Walsh sequence pairs having adjacent indexes; a plurality of signal combiners for generating a plurality of Walsh sequences; an inverter for inverting the polarity of one signal among a plurality of Walsh coded signals generated by the signal combiners; a plurality of waveform shaping apparatuses for generating a shaped spread spectrum signal by shaping the waveform of a plurality of walsh coded signals generated by the signal combiners and the waveform of the inverted Walsh coded signal generated by the inverter; and a plurality of digital/analog converters for converting the waveform shaped signal to analog values.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF THE INVENTION

The present invention will be described in detail below with reference to the accompanying drawings.

Figure 1:
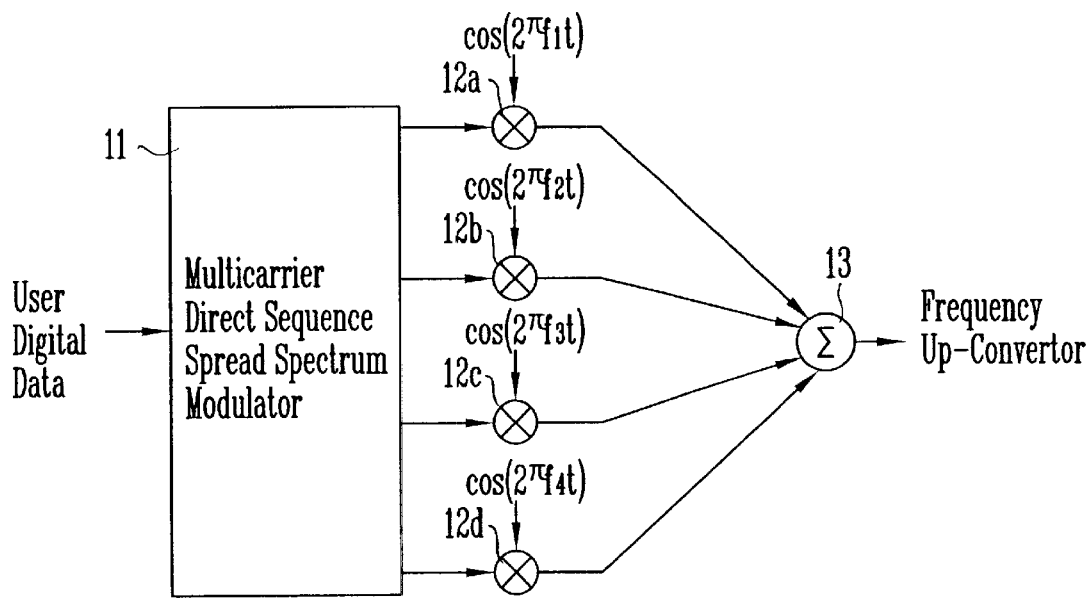
FIG. 1 is a structural drawing of a general multicarrier direct sequence spread spectrum communication system.

A structure of a general multicarrier direct sequence spread spectrum communication system, which modulates multicarrier composed of four different frequencies, is illustrated in FIG. 1.

First, user digital data is input to multicarrier direct sequence spread spectrum modulator 11 and four spread spectrum signals are provided. The four direct sequence spectrum spread signals are input to mixers 12a through 12d, respectively, and modulate a first carrier $\cos(2\pi f_1 t)$ having a first frequency $f_1$, a second carrier $\cos(2\pi f_2 t)$ having a second frequency $f_2$, a third carrier $\cos(2\pi f_3 t)$ having a third frequency $f_3$ and a fourth carrier $\cos(2\pi f_4 t)$ having a fourth frequency $f_4$. The four carriers modulated are added at modulated carrier coupler 13 and sent to a frequency up-converter. After up-conversion of frequency, they are sent to an amplifier and an antenna.

Figure 2:
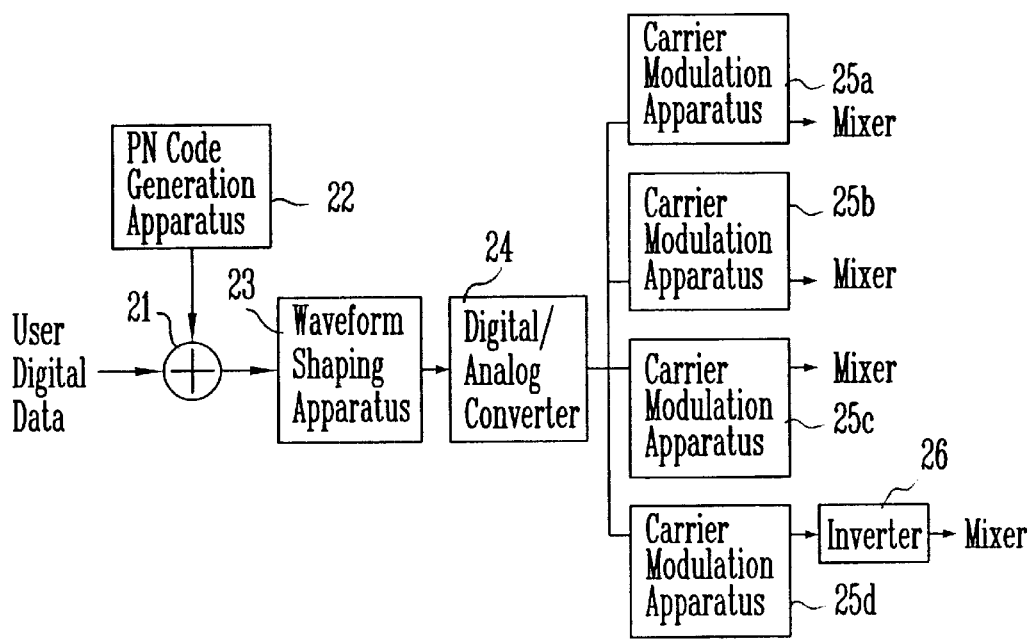
FIG. 2 is a structural drawing of the multicarrier direct sequence spread spectrum modulator according to a first embodiment of the present invention.

FIG. 2 is a structural drawing of the multicarrier direct sequence spread spectrum modulator according to the first embodiment of the present invention and shows a multicarrier direct sequence spread spectrum modulator in a system, in which four carriers are modulated by the same spectrum spread signal. This method can be used when the phase of carriers are varies independently in passing through the channel so that when a receiver receives other users' signal, there is no correlation between other user interference signal components modulated with other frequency.

The spectrum of user digital data inputted to the multicarrier direct sequence spread spectrum modulator is spread spectrum through Exclusive OR(EXOR) operation at spectrum spread combiner 21 with the output of Pseudo Noise (PN) code generator 22. The waveform of the spread spectrum signal is shaped through waveform shaping apparatus 23 which is a Finite Impulse Response (FIR) filter to remove interference between adjacent channels. Then, the waveform shaped signal is converted into analog signal at a digital/analog(D/A) converter 24. The signal converted into analog value is inputted to four carrier modulators 25a to 25d, modulates the carriers having different frequency, and the results are fed to mixers. At this time, the polarity of one of the four signals fed to mixers is inversed in an inverter 26. Thereafter, the modulated carriers are added at a combiner, sent to a frequency up-converter, and transmitted via an amplifier and an antenna. In the way described above, one of the four baseband signals has a polarity opposite to those of the remaining three signals, and as a result the enveloped variation of the transmitted signal can be reduced.

Figure 3:
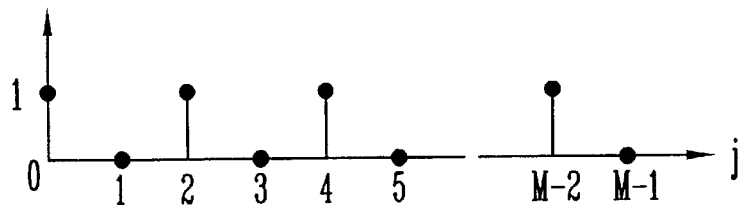
FIG. 3 shows a characteristics of product of adjacent Walsh codes.

FIG. 3 is a characteristic diagram of the product of Walsh codes with adjacent indexes. Hadamard matrix can be presented as the following formula 1 and can be made by a recursive procedure.

$$H_1 = [0] \quad \text{[Equation 1]}$$

$$H_2 = \begin{bmatrix} 0 & 0 \\ 0 & 1 \end{bmatrix} \text{ (Here, } \overline{H}_M \text{ is a binary complement of } H_M\text{)}$$

$$H_{2M} = \begin{bmatrix} H_M & H_M \\ H_M & \overline{H}_M \end{bmatrix}.$$

When $M=2^p$ for an arbitrary positive integer p and $W(i,j)$ is $(i+1,j+1)$the element of matrix $H_M$. In addition, the EXOR operation of $W(2i,j)$ and $W(2i+1,j)$ results in $W(1,j)$ as shown in FIG. 3. A Walsh sequence $W_i$ means repetition of $(i+1)$the row of $H_M$. Therefore, when the four code generators generates $W_{2i}$, $W_{2i+1}$, $W_{2k}$ and $W_{2k+1}$, the outputs of three code generators can have polarity opposite to that of the remaining one code generator output at arbitrary instant.

Figure 4:
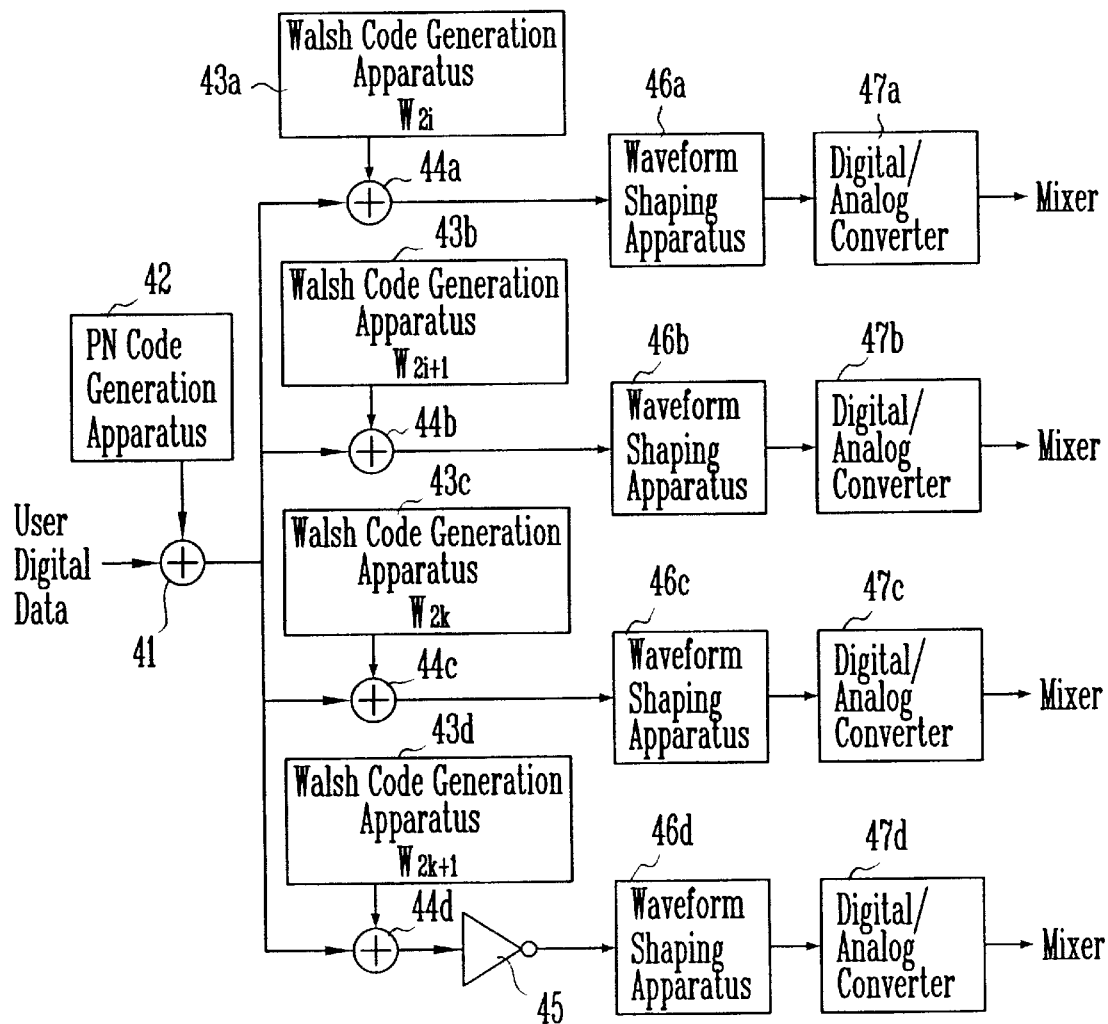
FIG. 4 is a structural drawing of the multicarrier direct sequence spread spectrum modulator according to a second embodiment of the present invention.

FIG. 4 is a constructional drawing of multicarrier direct sequence spread spectrum modulator according to second embodiment of the present invention.

In the case when the carriers used by all users have same phase relation ship and channel characteristics between different carrier frequencies are not independent, the other user interference signal received at the receipting side can not be reduced by frequency diversity. In this case, to obtain sufficient processing gain, different carriers must be modulated by signals which are spread by different codes. If carriers are modulated by the same signal, since in the symbol combine of a received other user interference modulated with other frequency is added coherently, the processing gin is reduced by the number of carriers. Therefore, to obtain sufficient processing gain, the baseband signals must be spread spectrum signals spread by codes having different auto-correlation side lobe characteristics.

First, the spectrum of user digital data inputted to multicarrier direct sequence spread spectrum modulator is spread by EXOR operation with the out put of PN code generator 42 at spread spectrum combiner 41. The spread spectrum signal is combined at four signal combiners 44a to 44d through EXOR operation with the output of Walsh code generators 43a through 43d, of which generates four different Walsh codes. The four different Walsh codes generates $W_{2i}$, $W_{2i+1}$, $W_{2k}$ and $W_{2k+1}$(i=k, k=0, 1, 2, ... ). Therefore, the outputs of four signal combiners 44a through 44d depend on the Walsh sequence property, that is, if the outputs of two Walsh code generators are the same or different at any instant, then the outputs of remaining two Walsh code generators are also the same or different, respectively. Therefore, one of the outputs of the Walsh code generators 43a through 43d is outputted as opposite logic value by the inverter 45, and one of the four outputs composed of the outputs of three signal combiners 44a through 44c plus the output of the inverter 45 has logical value opposite to that of the remain three outputs. The outputs of three signal combiners 44a through 44c and the inverter 45 are shaped at four waveform shaping apparatuses 46a through 46d which are FIR filters, converted to analog value by being passed through D/A converters 47a through 47d and sent to mixers to modulate each carrier. Thereafter, the modulated carriers are added at a combiner, sent to a frequency up-converter, and transmitted through an amplifier and an antenna. In the way described above, one of the four baseband signals each has a polarity opposite to that of the remaining three signals so that the change in magnitude of the transmission signal can be reduced.

According to the present invention as described above, there is an excellent effect that the linear requirement range of power amplifier can be reduced, the design of the amplifier is easy and the inexpensive and further miniaturized system is constructed by reducing the enveloped variation of the transmitted signal by making one of the four baseband signals which modulate each frequency have a polarity opposite to that of the remaining three signals.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodiments of the present invention.

What is claimed is:

1. A spread spectrum modulator for use in a multicarrier direct sequence spread spectrum communication system, said spread spectrum modulator comprising:

input means for receiving digital data;

a pseudo noise code generator for generating a binary pseudo noise code;

a spread spectrum signal combiner, having two inputs for receiving said digital data and said binary pseudo noise code and for combining said inputs to generate a baseband digital spread spectrum signal;

a waveform shaper, for receiving said spread spectrum signal as an input, and for generating a shaped baseband digital spread spectrum signal;

an analog-to-digital converter for receiving said shaped spread spectrum signal, and for converting said shaped digital spread spectrum signal to a shaped analog baseband spread spectrum signal;

modulating means for receiving said shaped analog baseband spread spectrum signal, for modulating a plurality of carrier modulators, said modulation means generating a plurality of non-inverted carrier modulated spread spectrum signals;

an inverter for converting the polarity of one of said non-inverted carrier modulated spread spectrum signals and for generating an inverted carrier modulated spread spectrum signal; and a combiner for combining the plurality of non-inverted carrier modulated spread spectrum signals and said inverted carrier modulated spread spectrum signal into a combined transmission signal for transmission over a communications channel.

2. A spread spectrum modulator for use in a multicarrier direct sequence spread spectrum communication system, said spread spectrum modulator comprising:

input means for receiving digital data;

a pseudo noise code generator, for generating a binary pseudo noise code;

a spread spectrum combiner, having two inputs for receiving said digital data and said binary pseudo noise code, for combining said inputs to generate a digital spread spectrum signal;

a plurality of Walsh code generators for generating a plurality of Walsh sequence pairs having adjacent indexes;

a plurality of signal combiners, each of said combiners receiving said digital spread spectrum signal and one of said plurality of Walsh sequence pairs, for generating a plurality of digital non-inverted Walsh coded signals;

an inverter for inverting the polarity of one of said plurality of digital non-inverted Walsh coded signals into a digital inverted Walsh coded signal;

a plurality of waveform shapers, for receiving said plurality of digital non-inverted Walsh coded signals and said digital inverted Walsh coded signal, for generating a plurality of non-inverted shaped digital spread spectrum signals and an inverted shaped digital spread spectrum signal;

a plurality of analog-to-digital converters, for receiving said plurality of non-inverted digital shaped spread spectrum signals and said inverted digital shaped spread spectrum signal, for converting said plurality of non-inverted shaped digital signals and said inverted digital shaped spread spectrum signal to a plurality of non-inverted analog shaped spread spectrum signals and an inverted analog shaped spread spectrum signal;

modulating means for receiving said plurality of non-inverted analog shaped spread spectrum signals and said inverted analog shaped spread spectrum signal, for modulating a plurality of carrier modulators, said modulation means generating a plurality of non-inverted analog shaped carrier modulated spread spectrum signals and an inverted analog shaped carrier modulated spread spectrum signal; and a combiner for combining the plurality of non-inverted analog shaped carrier modulated spread spectrum signals and said inverted analog shaped carrier modulated spread spectrum signal into a combined transmission signal for transmission over a communication channel.

3. The spread spectrum modulator of claim 1, wherein said modulating means comprises a plurality of carrier modulators, each carrier modulator having a unique carrier frequency.

4. The spread spectrum modulator of claim 1, further comprising a frequency up-converter for receiving said combined transmission signal and for allowing transmission of said combined transmission signal over a communication channel via an amplifier and antenna.

5. The spread spectrum modulator of claim 1, wherein said digital data and pseudo noise code are combined by performing an Exclusive-OR operation.

6. The spread spectrum modulator of claim 2, further comprising a frequency up-converter for receiving said combined transmission signal and for allowing transmission of said combined transmission signal over a communication channel via an amplifier and antenna.

7. The spread spectrum modulator of claim 1, wherein said waveform shaper is an FIR filter.

8. The spread spectrum modulator of claim 2, wherein said waveform shaper is an FIR filter.

9. The spread spectrum modulator of claim 2, wherein said digital data and pseudo noise code are combined by performing an Exclusive-OR operation.

* * * * *